A. HODDENBACH.
CULINARY UTENSIL.
APPLICATION FILED DEC. 14, 1915.

1,282,230.

Patented Oct. 22, 1918.

INVENTOR:
Andrew Hoddenbach
BY
Fred'k J. Larson
ATTORNEY.

UNITED STATES PATENT OFFICE.

ANDREW HODDENBACH, OF DENVER, COLORADO.

CULINARY UTENSIL.

1,282,230.  Specification of Letters Patent. Patented Oct. 22, 1918.

Application filed December 14, 1915. Serial No. 66,712.

*To all whom it may concern:*

Be it known that I, ANDREW HODDENBACH, a subject of the Queen of the Netherlands, residing at Denver, in the county of Denver and State of Colorado, have invented a certain new and useful Culinary Utensil, of which the following is a specification.

My invention relates to culinary utensils and more particularly to that class of utensils as are used for cooking foods by steaming.

The objects of my invention are, first, to provide a main receptacle adapted to hold water; second, to provide a plurality of slidably mounted, removable egg holding trays disposed within the main receptacle above the water line; third, to provide guiding and supporting means for said trays; fourth, to provide a cereal cooking receptacle disposed within said main receptacle; fifth, to provide a perforated plate disposed within said main receptacle intermediate the egg-holding trays and the cereal cooking receptacle; and, sixth, to provide the egg holding trays with a plurality of small perforations in the bottom of egg seats thereof.

With the above and other objects in view, the invention consists in certain new and novel features of construction, combination and arrangement of parts, as will be hereinafter more fully described and finally pointed out in the claims hereto appended.

Referring to the accompanying drawing forming a part of this specification wherein like characters of reference denote similar parts throughout the several views.

Figure 1:
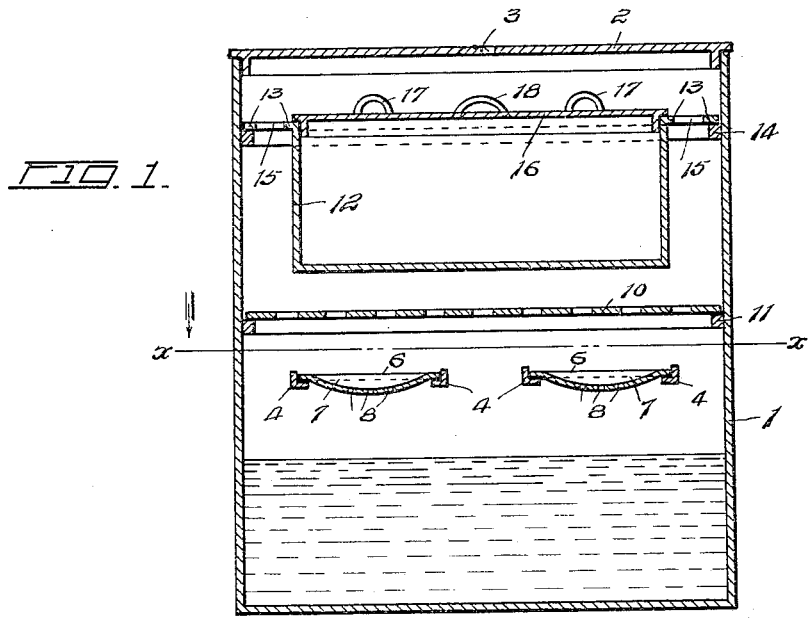
Figure 1, is a vertical sectional view of my improved culinary utensil.

In carrying out the aim of my invention, I employ a suitable main receptacle or boiler 1 provided with a suitable removable cover 2 having the steam vent 3. The boiler or receptacle 1 is adapted to hold water, as is manifest.

A plurality of guide and supporting members 4 are arranged in pairs and in suitable spaced relation within the main receptacle 1 and suitably secured at their ends to opposite sides of the receptacle or boiler 1. One of the walls of the receptacle 1 is provided adjacent one end of each pair of guide and supporting members with a suitable opening 5.

Adapted to pass through each opening 5 and be slidably supported by means of the members 4 is an egg holding tray 6. Each egg holding tray 6 is provided with a plurality of concaved egg seats 7 for the reception of an egg or eggs to be steamed or poached. Each egg seat 7 gradually tapers slightly to one edge of the tray 6, as clearly shown in Fig. 2, to permit the egg or eggs to be easily removed by sliding same from the egg holding trays into a suitable dish. The bottom of each egg-seat 7 is preferably provided with a plurality of small perforations 8 through which the steam may rise or pass, thus having a tendency to loosen the egg from the egg-seat and allow the egg to be steamed from all sides.

Figure 2:
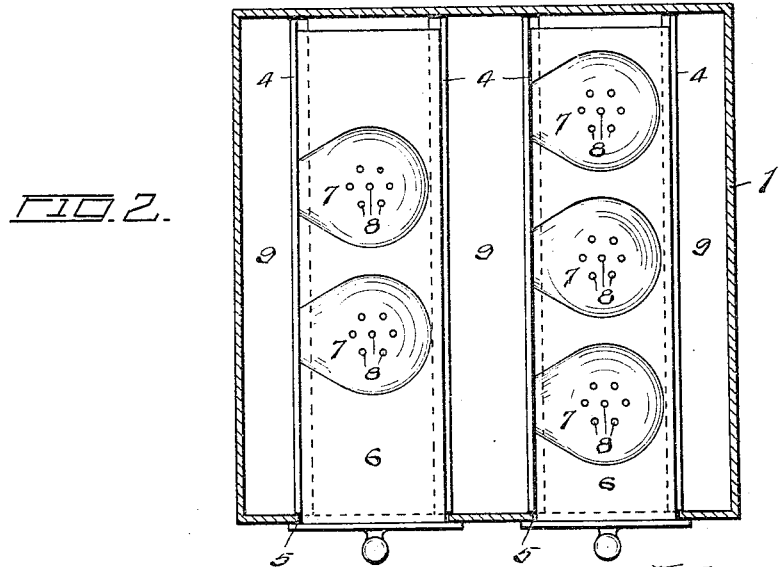
Fig. 2, is a sectional view, taken on line X—X of Fig. 1.

Steam spaces 9 are provided between the egg holding trays 6, as clearly shown in Fig. 2, so that steam rising from the boiling water may circulate entirely around the egg holding trays to cook the eggs from all sides.

A perforated plate or partition 10 is removably supported or disposed within the receptacle 1 upon the supporting flange 11. The plate 10 separates two distinct cooking chambers or compartments, a lower one and an upper one.

A cereal cooking receptacle 12 is disposed and removably supported within the upper cooking chamber. The flanged edge 13 of the receptacle 12 is adapted to seat upon the supporting flange 14, which flange is suitably secured to the walls of the receptacle 1. The flange 13 is provided with a plurality of steam openings or passages 15 to permit the rising steam from the lower chamber to freely circulate around the receptacle 12. The receptacle 12 may or may not be provided with a removable cover 16. The cover 16 is preferably provided with suitable handles 17. The receptacle 12 is also preferably provided with a pair of suitable lifting handles 18.

From the foregoing description it will be seen that more than one kind of food may be steamed or cooked at a time, and for restaurants, hotels, and like places my improved utensil will serve the purpose of several separate utensils, and will take up less cooking space upon the stove.

Any number of egg holding trays 6 may be employed in my utensil, and for restaurants and like places where many eggs are steamed or poached during a meal period, my improved egg steaming or poaching means will obviate the necessity of many poaching pans scattered about the surface of the stove, thus rendering quicker and better service than when the ordinary poaching pan is employed.

The many advantages of the herein described invention, will readily suggest themselves to cooks and those skilled in the art to which the invention appertains.

Obviously, my invention admits of considerable modification within the scope of the invention, and therefore I do not wish to be limited to the specific construction shown and described, but reserve the right to make any such changes as may fairly fall within scope of the appended claims.

What I claim is:

1. A culinary utensil comprising a receptacle adapted to hold boiling water, and a plurality of laterally disposed, slidably mounted egg holding trays positioned above the water line in said receptacle, each of said egg holding trays being provided with a plurality of concaved egg seats having their bottom provided with a plurality of perforations and each egg seat gradually tapering to one of the side edges of the tray to permit easy lateral sliding of the egg in removal from the tray.

2. A culinary utensil comprising a closed receptacle, a plurality of supporting guides arranged in pairs within said receptacle and secured at their ends to opposite sides of said receptacle, said receptacle having one of its walls provided adjacent one end of each pair of supporting guides with a receiving opening, an egg holding tray adapted to pass through each receiving opening and slidably supported by means of said supporting guides, steam spaces formed within said receptacle between each tray and the side walls of the receptacle and each tray, and each of said trays being provided with a plurality of concaved egg seats having their bottom provided with a plurality of perforations, each of which egg seats gradually tapers to one of the side edges of the tray.

3. A culinary utensil comprising a receptacle adapted to hold boiling water, and a plurality of laterally disposed, slidably mounted egg holding trays positioned above the water line in said receptacle, each of said egg holding trays being provided with a plurality of concaved egg seats having their bottom provided with a plurality of perforations and each egg seat gradually tapering to one of the side edges of the tray, and a cereal cooking receptacle adapted to be disposed in said water holding receptacle, said cereal cooking receptacle having a flanged edge provided with a plurality of steam openings to permit the rising steam from the water holding receptacle to pass entirely around said cereal cooking receptacle.

4. A culinary utensil comprising a receptacle adapted to hold boiling water and a plurality of laterally disposed, slidably mounted egg holding trays positioned above the water line in said receptacle, each of said egg holding trays being provided with a plurality of concaved egg seats having their bottom provided with a plurality of perforations and each egg seat gradually tapering to one of the side edges of the tray, a cereal cooking receptacle disposed in said water holding receptacle, a flanged edge for said cereal cooking receptacle having a plurality of steam openings to permit the rising steam within said water holding receptacle to pass entirely around said cooking receptacle, and a perforated plate disposed within said water holding receptacle intermediate said egg holding trays and said cereal cooking receptacle.

5. A culinary utensil comprising a receptacle adapted to hold boiling water and a plurality of laterally disposed, slidably mounted egg holding trays positioned above the water line in said receptacle, each of said egg holding trays being provided with a plurality of concaved egg seats having their bottom provided with a plurality of perforations and each egg seat gradually tapering to one of the side edges of the tray, a cereal cooking receptacle disposed in said water holding receptacle, a flanged edge for said cereal cooking receptacle having a plurality of steam openings to permit the rising steam within said water holding receptacle to pass entirely around said cooking receptacle, guides for supporting the flanged edge of said cooking receptacle, a perforated plate disposed within said water holding receptacle intermediate the egg holding trays and the cereal cooking receptacle, and guides for slidably supporting said perforated plate.

In testimony whereof I affix my signature in presence of two subscribing witnesses.

ANDREW HODDENBACH.

Witnesses:
F. R. CLINE,
FRED'K J. LARSON.

Copies of this patent may be obtained for five cents each, by addressing the "Commissioner of Patents, Washington, D. C."